United States Patent [19]

Abbey, III et al.

[11] Patent Number: 5,192,013
[45] Date of Patent: Mar. 9, 1993

[54] SCARFING APPARATUS

[75] Inventors: Nelson D. Abbey, III, Monclova; Timothy J. Lewandowski, Swanton, both of Ohio

[73] Assignee: Abbey Etna Machine Company, Perrysburg, Ohio

[21] Appl. No.: 763,338

[22] Filed: Sep. 20, 1991

[51] Int. Cl.$^5$ ............................................. B23K 37/08
[52] U.S. Cl. ..................................... 228/13; 228/125; 266/51; 29/33 A
[58] Field of Search ................. 228/13, 160, 125, 17.5; 29/33 A; 266/51

[56] References Cited

U.S. PATENT DOCUMENTS

| | | | |
|---|---|---|---|
| 2,120,316 | 6/1938 | Stone | 228/13 |
| 2,601,812 | 7/1952 | Honen | 29/33 A |
| 3,249,349 | 5/1966 | Thompson et al. | 266/51 |
| 3,748,719 | 7/1973 | Fuller et al. | 228/13 |
| 4,587,698 | 5/1986 | Bonner et al. | 228/125 |
| 4,600,180 | 7/1986 | Abbey, III | 266/51 |

FOREIGN PATENT DOCUMENTS 0649196 2/1981 U.S.S.R. ............................ 29/33 A

Primary Examiner—Richard K. Seidel
Assistant Examiner—Jeffrey T. Knapp
Attorney, Agent, or Firm—Marshall & Melhorn

[57] ABSTRACT

The invention comprises an apparatus for removing from the outer surface the raised bead resulting from welding in the manufacture of continuous seam-welded metal tubes. A stage or travelling support block mounted for movement transversely of the advancing tube carries a pair of scarfing blades, each of which may have a plurality of cutting edges moveable seriatim into operative position. Adjusting screws operatively connected to the stage permit the stage and the scarfing blades thereon to be manually adjusted both laterally and vertically relative to the tube, and to selectively position either one of the scarfing blades for bead removal. A piston rod is connected by suitable linkage to the stage for rapidly advancing and retracting the stage upon command to move the scarfing blade into and out of operative position.

8 Claims, 4 Drawing Sheets

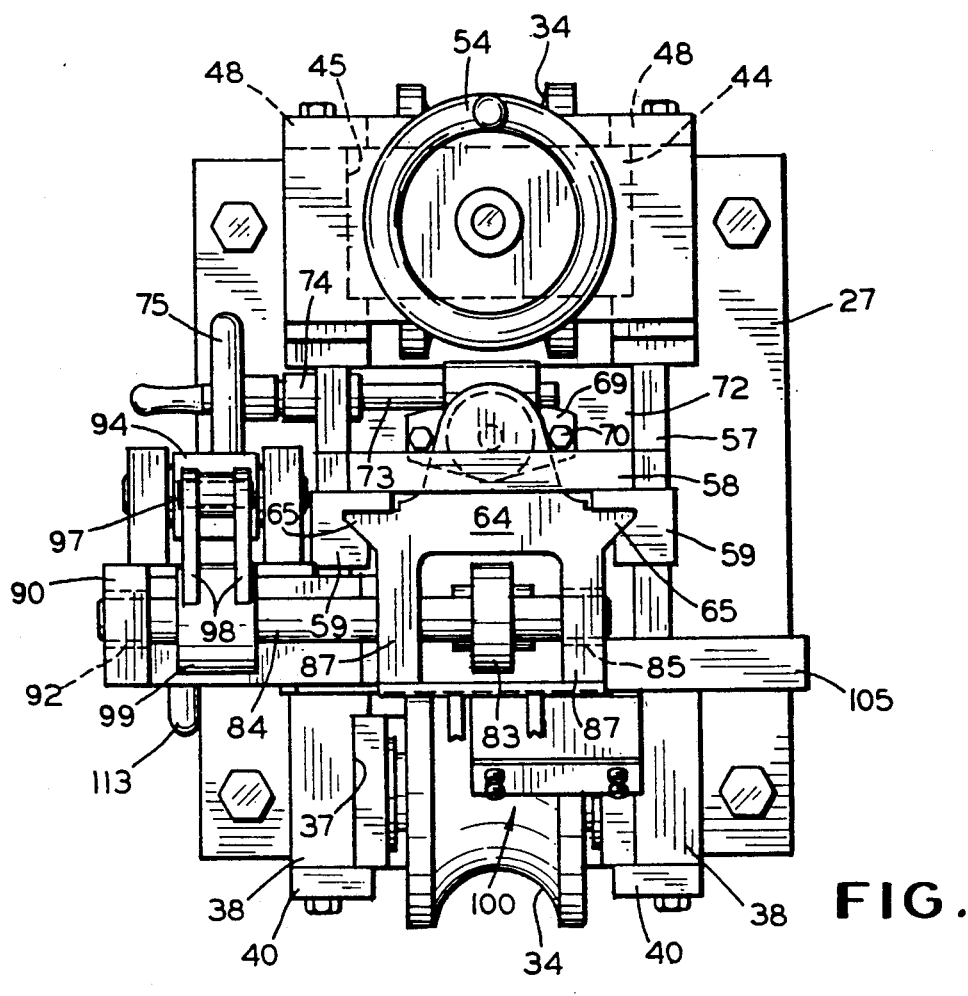
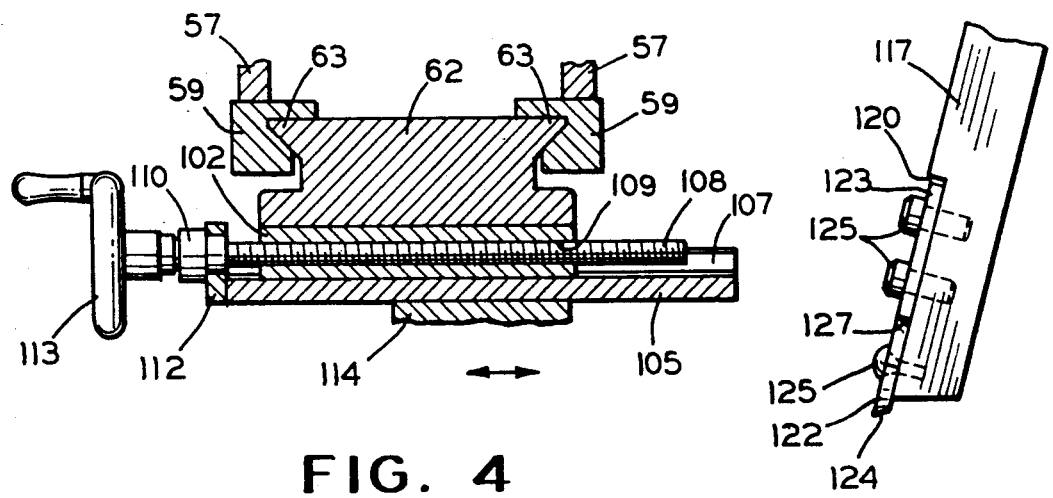
FIG. 6
FIG. 4
FIG. 5

SCARFING APPARATUS

BACKGROUND OF THE INVENTION

1. Field of the Invention

The present invention relates generally to the manufacture of continuous seam-welded metal tubes or pipes, and more particularly to a novel apparatus for scarfing or removing from the outer surface of the tube or pipe the raised bead or flash resulting from welding of the seam.

2. Description of the Prior Art

In accordance with a well-known process for producing seam-welded pipes and tubes, a continuous strip or skelp is advanced through forming apparatus and progressively deformed into a tubular form having an open, longitudinally extending seam. The tubular form then advances through a welding station wherein the adjacent longitudinal edges are urged together and joined by a suitable welding process. The particular welding process employed will generally be indicated by the material from which the tube or pipe is formed, for example, low carbon steel, stainless steel, aluminum, etc., and may include any of the well-known welding techniques conventionally employed with the different materials. In a preferred process the tube or pipe is heated by electrical induction so that the edges achieve fusion temperature, and the heated edges are forced together to produce a continuous monolithic weld of the seam. As a result of the pressure applied in forcing the heated edges together to achieve fusion, the material bulges both outwardly and inwardly to create a raised bead or flash extending along the longitudinal weld seam. In seams formed by other types of welding such as arc welding and gas welding, a similar raised bead or seam is generally formed along at least the outer surface of the tube.

In order to produce a commercially acceptable product, it is generally necessary to remove the protruding portion of the weld bead or flash flush with the surface of the tube or pipe. Various devices have been proposed heretofore for removing both the internal bead and the external bead. Removing the internal bead is, of course, more difficult than removing the external bead due to the restricted access to the removal area. A scarfing tool particularly suited for removing the internal bead is disclosed in U.S. Pat. No. 4,600,180, issued Jul. 15, 1986. Removal of the external bead can be accomplished by any of a number of conventional processes including grinding and scarfing. One type of external surface scarfing apparatus is described in U.S. Pat. No. 3,249,349, issued May 3, 1966.

While a number of devices have been employed heretofore in removing or scarfing the external weld bead from seam welded pipe or tubing, those prior art devices have not proved entirely satisfactory for the present day high speed production of continuously formed seam welded pipe or tubing. It is highly desirable to remove the weld bead immediately following the welding procedure, while the bead and pipe retain sufficient heat from the welding process and remain at the proper temperature for scarfing. The apparatus should also be able to evenly and accurately remove the bead or flash for extended periods of time without requiring interruption of operation of the line for the continuous production of the seam welded tubes or pipes. The devices heretofore available have lacked the capability to quickly and readily adapt to changes in operation while permitting continuous operation of the tube forming apparatus.

SUMMARY OF THE INVENTION

In accordance with the present invention the aforementioned deficiencies of the prior art devices are overcome by providing a scarfing apparatus which can function as an individual unit in a tube forming apparatus, or which can be employed as one of a series of two or more such units disposed in tandem along a tube forming line and rapidly and selectively moved into and out of operation in conjunction with others of the units to provide continuous accurate removal of the weld bead or flash. A stage or travelling support block mounted for movement transversely of the advancing newly formed tube carries at least two replaceable scarfing tools adapted for selective positioning of a selected one of the scarfing tools in operative position relative to the advancing tube. Each tool may have a plurality of cutting surfaces for movement into scarfing position one after another as the cutting surfaces become worn. The apparatus includes mechanism for moving the scarfing tools toward and away from the tube to precisely position the cutting surface of the tool relative to the tube surface from which the weld bead is to be removed, and linkage mechanism is provided for rapidly moving the scarfing tool between operative and retracted inoperative positions in response to an appropriate signal. The bead is removed as a continuous strip and wound upon a reel positioned above the advancing tube for disposal.

It is therefore an object of the invention to provide an improved apparatus for scarfing the raised weld bead or flash from the outer surface of a longitudinal seam welded tube.

Another object of the invention is to provide such an apparatus capable of producing an improved scarfed seam on seam welded tube.

Still another object of the invention is to provide an apparatus for precisely removing the raised weld bead from continuously produced longitudinal seam welded tubing for extended periods of time without significant interruption of the production process.

Other objects and advantages of the invention will become more apparent during the course of the following description, when taken in connection with the accompanying drawings

BRIEF DESCRIPTION OF THE DRAWINGS

In the drawings, wherein like numerals are employed to designate like parts throughout the same:

FIG. 4 is a sectional view, taken substantially along line 4—4 of FIG. 3;

FIG. 5 is an enlarged fragmentary side view of the cutting tool and holder of the apparatus;

FIG. 6 is an enlarged plan view of a scarfing apparatus in accordance with the invention.

DESCRIPTION OF THE PREFERRED EMBODIMENT

Figure 1:
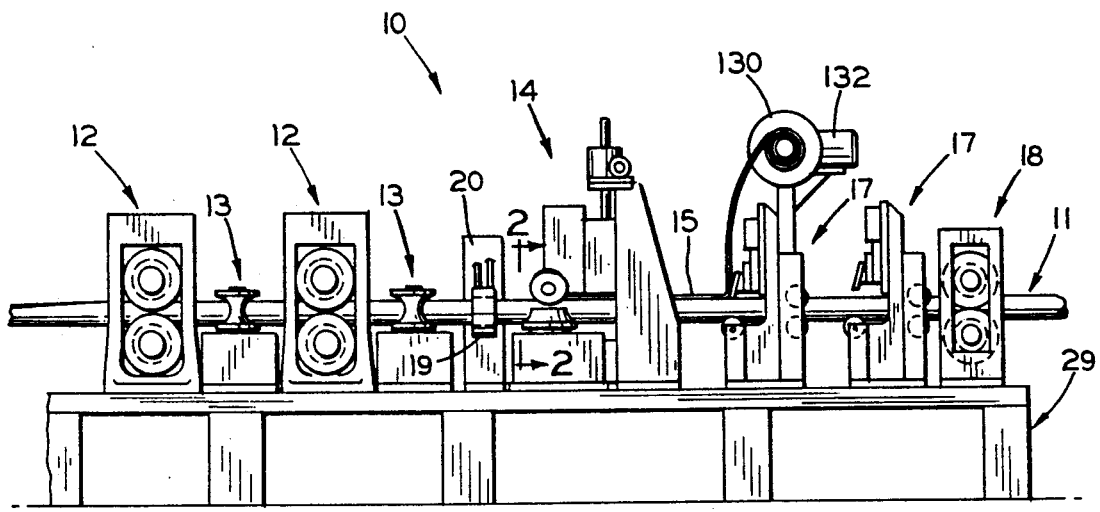
FIG. 1 is a schematic side elevational view of a portion of a line for producing continuous seam welded pipe or tubing and embodying the invention.

There is shown schematically at 10 in FIG. 1 a portion of a conventional tube forming mill for continuously producing a cylindrical seam-welded metal tubing 11. In such mills a metal strip or skelp is continuously withdrawn from a supply (not shown) and advanced through a series of opposed forming rolls 12 and side closing rolls 13 whereby it is progressively bent into tubular form. The formed blank then advances through a welding station 14 wherein the seam is suitably welded to produce a continuous seam-welded tube having, incident to the welding, a raised bead or flash 15 extending longitudinally along its outer surface. The tube then passes through a scarfing unit 17 for removal of the raised bead. As indicated hereinabove and as illustrated in FIG. 1, two or more of the scarfing units 17 may be located in tandem along the production line to permit alternate use of the units. Thereafter, the tube may be advanced through additional traction and working roll units 18 (only one shown) for final working prior to being cut into units of desired length or otherwise prepared for shipment to customers.

Figure 2:
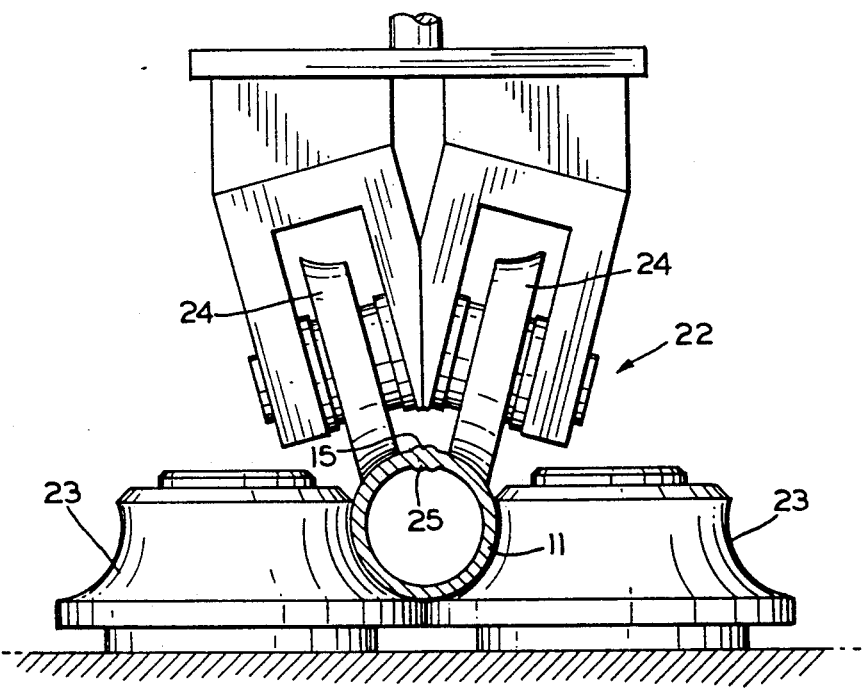
FIG. 2 is an enlarged elevational view taken substantially along line 2—2 of FIG. 1.

As indicated above, it is contemplated that the seam of the tube can be welded by any of the well-known welding processes suitable for the particular material from which the tube is formed. According to a widely used procedure as illustrated in FIGS. 1 and 2, the tube is heated by induction and the edges of the tube are urged against one another while the material is at a sufficiently high temperature to cause them to fuse together. To that end, at the welding station 14 as will be seen in FIG. 1, the formed tube 11 passes through an induction coil 19 of an induction heating unit 20. The heated tube immediately enters a roller press 22 where it passes between opposed side rolls 23 and beneath angularly disposed press rolls 24 which force the edges of the confined tube together. As a result of the temperature of the tube material and the pressure applied by the rolls 23 and 24, the edges of the formed tube fuse together at their interface and the material bulges outwardly along the seam to create the continuous raised bead 15. The material also may bulge inwardly to create an interior bead 25 (FIG. 2).

Immediately following welding and formation of the bead 15, and while remaining at nearly the fusion temperature, the tube enters the scarfing unit 17. As illustrated generally in FIG. 3, the novel scarfing unit of the invention includes a base plate 27 anchored as by bolts 28 to a base structure 29. In order to support and guide the tube through the scarfing units, a support roll 30 is positioned beneath the tube opposite the point at which the bead 15 is removed. The tube passes between cooperating, opposed upper and lower guide rolls 32 and 33, respectively, disposed adjacent the support roll. Each of the support and guide rolls is configured with a curved circumferential peripheral surface 34 (FIGS. 6 and 7) particularly adapted to accommodate substantially one-half the circumferential surface of the tube 11, and to thus guide the pipe along a precise predetermined path through the unit.

In order to permit the scarfing units to be readily changed to accommodate tubes of different diameters, provision is made for quickly and simply removing and replacing the rolls 30, 32 and 33. To that end, the roll 30 is conventionally journalled for rotation within a clevis 35 which, in turn, is removably received within a recessed portion 37 of an upstanding bracket 38 affixed to the base plate 27. At its closed and the clevis is adapted to be supported upon shims 39 resting upon the base plate and of suitable thickness to support the roll at the proper elevation. The clevis is held within the recess 37 by retainer plates 40 adjustably secured to the legs of the bracket 38 by bolts 42 extending through elongated openings 43 in the plates. Thus, the support roll 30 can be exchanged by merely loosening the bolts 42, sliding the retainer plates 40 outwardly and removing the clevis 35 carrying the support roll. Another clevis having the appropriate support roll journalled therein is inserted into the recess 37, and suitable shims 39 are positioned beneath the clevis to position the roll at the desired height. The retainer plates are then moved inwardly and the bolts are tightened to complete the exchange.

The guide rolls 32 and 33 are similarly journalled for rotation within mounting frames or clevises 44 removably carried within a recess 45 of a support bracket 47 affixed to the base plate 27. The mounting frames carrying the rolls 32 and 33 are secured within the recess by retainer plates 48 adjustably secured to the legs of the support bracket 47 by bolts 49 extending through horizontally elongated openings (not shown) in the plates. In order to provide for proper vertical positioning of the rolls 32 and 33, the lower mounting frame 44 is supported upon shims (not shown) in a manner similar to the clevis 35, and the upper mounting frame 44 is adapted for vertical sliding movement within the recess 45. An adjusting screw 50 is connected to the top of the upper mounting frame 44 as by a swivel connector 52 threaded into or otherwise removably coupled to the mounting frame. The adjusting screw extends through and is in threaded engagement with a block 53 affixed atop the support bracket 47, and is provided at its upper end with a rotary hand wheel 54. Thus, by suitably turning the hand wheel the mounting frame 44, and hence the guide roll 32 carried thereby, can be vertically adjusted relative to the guide roll 33 for accommodating the tube 11 passing therebetween. The rolls 32 and 33, as with the roll 30, can be readily removed and replaced by disconnecting the swivel connector 52, loosening the bolts 49, and retracting the retaining plates 48 to remove the clevises 44. Replacement rolls can then be installed by reversing the procedure.

The scarfing or bead removal mechanism of the invention, identified generally at 55, is carried by a pair of side plates 57 disposed on opposite sides of the path of the tube 11 The side plates are positioned between the brackets 38 and 47 and affixed at their lower end to the base plate 27, and are interconnected at their upper end by a cross bar 58. As will be hereinafter described, the novel scarfing units include provision for precisely adjusting the cutting blade both vertically and laterally relative to the tube 11, quickly advancing and retracting the cutting blade into and out of operative position, and moving alternate blades into and out of operative position for replacement of the cutting edge with a minimum interruption in production.

To that end, there is affixed to each of the side plates 57 a vertically extending side rail 59 having a slideway 60 formed therein. A lower mounting block 62 includes oppositely disposed wings 63 configured for reception within the slideways whereby the mounting block is adapted for movement vertically along the side rails 59. A U-shaped carrier 64 positioned above the mounting block 62 likewise includes oppositely disposed wings 65 configured for reception within the slideways so that the carrier can be readily moved to selected vertical positions along the side rails 59.

As will be hereinafter explained, the mounting block 62 is coupled to the carrier 64 and the carrier serves to both precisely position the mounting block, upon which the cutting tools are carried, in operative position relative to the tube and bead or seam 15, and to quickly move the cutting tool into and out of operative position. More particularly, a boss 67 extending rearwardly from the carrier 64 has connected thereto a threaded shaft 68 of a screw jack 69. The screw jack is secured as by bolts 70 (FIG. 6) to a mounting plate 72 extending between and affixed to the side plates 57. An operating shaft 73 conventionally coupled to the screw jack extends through a bearing 74 in the side plate 57 and has a hand adjusting wheel 75 at its end. Thus, by appropriately manipulating the hand wheel 75 the screw jack 69 is operated to advance the threaded shaft 68 therethrough and correspondingly raise or lower the carrier 64.

In order that the lower mounting block 62 may move up and down with the carrier 64 and, as well, be raised and lowered relative to the carrier, the block and carrier are interconnected as by linkage identified generally at 77. More particularly, the mounting block 62 includes a boss 78 to which a pair of links 79 are pivotally connected by a pin 80. At their opposite end the links are pivotally connected by a pin 82 to an arm 83. The arm is keyed to a shaft 84 rotatably mounted in bearings 85 carried within each of a spaced pair of walls 87 comprising the flanges of the U-shaped carrier 64. A bracket 88 is affixed to the appropriate one of the walls 87 of the U-shaped carrier as by stud bolts 89. A flange 90 projecting upward at the outer end of the bracket carries a bearing 92 within which the end of the shaft 84 is rotatably journalled. There is also affixed to the bracket 88 as by stud bolts 93 a conventional fluid or electromechanically activated cylinder assembly 94 having a reciprocable piston rod 95. Suitable means (not shown) is provided for actuating the cylinder to selectively extend and retract the piston rod in the conventional manner. At its distal end the piston rod is pivotally connected by a pin 97 to spaced arms 98 of a crank member 99 keyed to the shaft 84 so as to rotate the shaft in response to extension and/or retraction of the piston rod.

Figure 3:
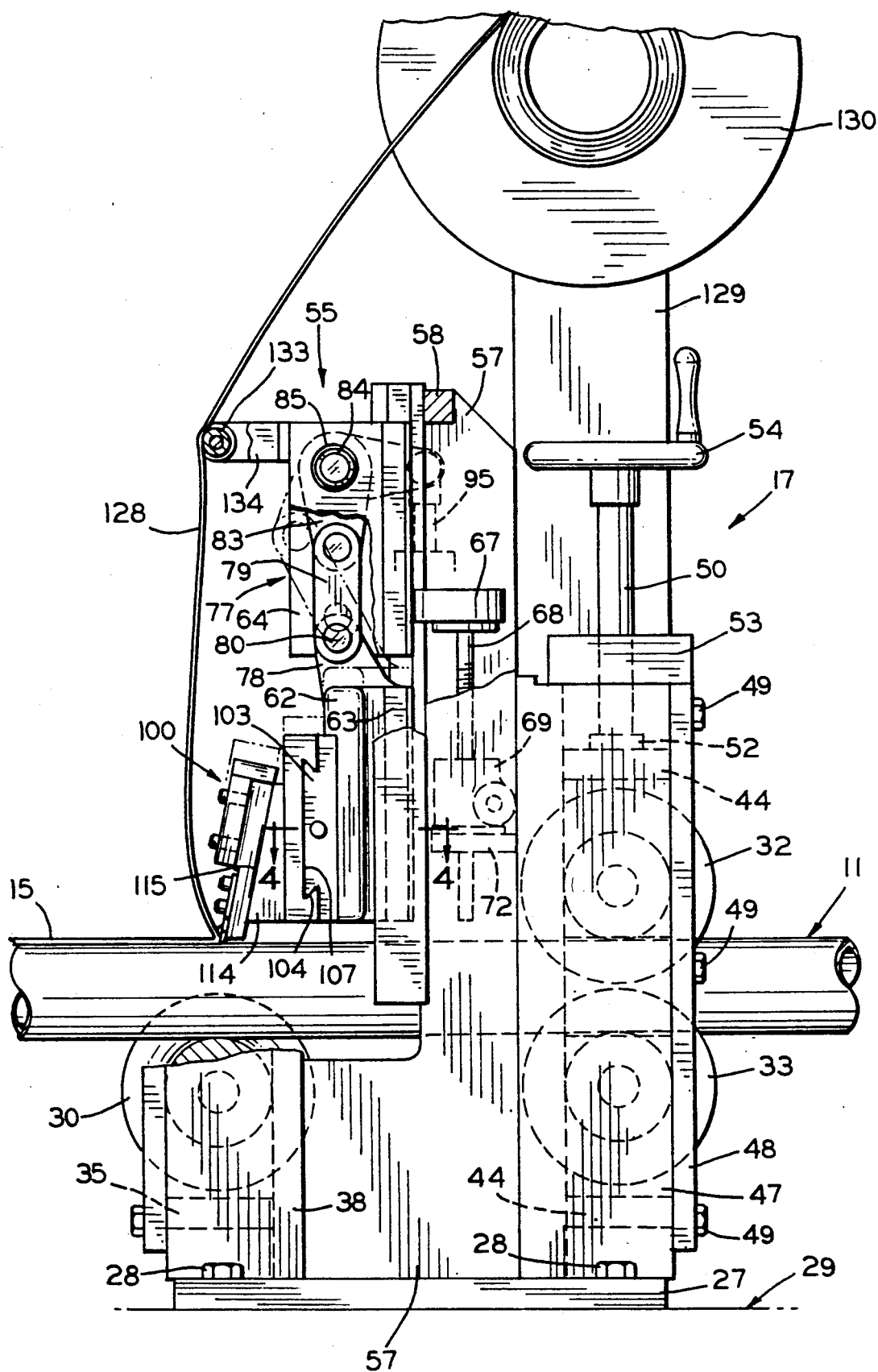
FIG. 3 is an enlarged side elevation of the scarfing apparatus of FIG. 1, with parts broken away for clarity.

Thus, as will be seen in FIG. 3, with the piston rod extended the crank member 99 will rotate the shaft 84 to a position where the arm 83, links 79 and lower mounting block 62 will be in the positions shown in solid lines. When the piston rod is retracted the crank member 99 will be rotated clockwise as viewed in FIG. 3, swinging the arm 83 and links 79 to the position shown in broken lines and consequently raising the lower mounting block 62 and cutting tools carried thereby to the position partially shown in broken lines.

The bead 15 is removed from the tube by a cutting assembly shown generally at 100 affixed to the lower mounting block 62. As heretofore indicated, an important feature of the invention is that the blade which removes the bead can be precisely positioned both laterally and vertically relative to the tube, and an alternate blade can be quickly moved into operative position to permit replacement of worn cutting surfaces with a minimum inconvenience to the continuing operation of the tube facility. To that end, the cutting assembly comprises a bed plate 102 affixed to the lower mounting block 62 and including a raised flange 103 extending transversely of the tube 11 and having oppositely disposed undercut side walls 104. A travelling support block 105 is provided in its rear surface with a mating recess 107 for receiving the raised flange and providing for sliding movement of the travelling support block along the bed plate. As best seen in FIG. 4, in order to provide for sliding movement of the support block to selected positions relative to the bed plate 102, a lead screw 108 is threadably received within a threaded opening 109 extending longitudinally through the bed plate. The lead screw is rotatably mounted within a bushing 110 carried by a plate 112 extending along an edge of the travelling support block, and a hand wheel 113 is affixed to the end of the lead screw adjacent the bushing. Thus, by appropriately manipulating the hand wheel 113, the lead screw can be advanced and retracted through the mounting block 62 to move the travelling support block 105 to selected lateral positions.

The blade which separates the bead 15 from the tube 11 is preferably inclined downwardly and forwardly toward the advancing tube as illustrated in FIG. 3 so that the cutting edge cleanly severs the bead material from the tube. In order to achieve the desired angle of inclination, there is affixed to the travelling support block 105 a wedge block 114 having an inclined bearing surface 115. One or more scarfing blade holders 117 are affixed to the wedge block and along the bearing surface as by a cover plate 118 secured by stud bolts 119 extending through the blade holders and threaded into the wedge block. In order to enable alternate scarfing blades to be moved into operative position, at least two such blade holders are preferably mounted at laterally spaced positions along the wedge.

Figure 7:
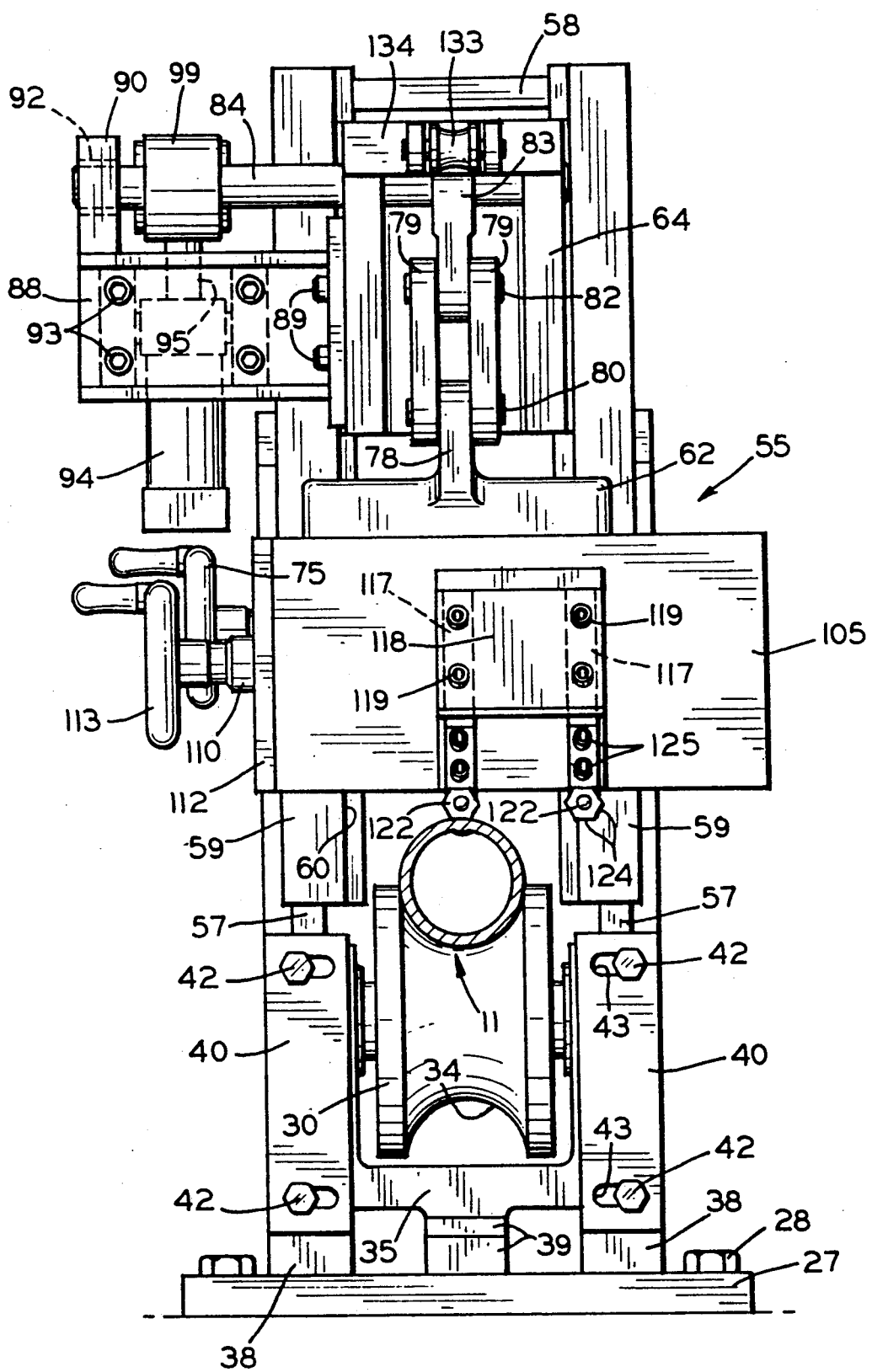
FIG. 7 is an enlarged fragmentary, end elevation of the scarfing apparatus of the invention as viewed from left to right in FIG. 1.

As will be seen in FIGS. 5 and 7, the blade holders 117 are recessed at their lower end as at 120 for receiving a scarfing blade 122 and a retainer plate 123. While the scarfing blade itself may comprise any of a number of well-known such devices, in its preferred form the blade is a so-called star blade of hexagonal configuration and having six individual cutting edges 124 disposed around its perimeter. The blade is rotatably affixed to the holder 117 by a suitable fastener 125 so that a fresh cutting edge can be moved into operative position as necessary by rotating the blade until each of the edges has been used. The retainer plate 123, removably secured in place by stud bolts 125 extending therethrough and threaded into the blade holder, is configured so that its lower end 127 engages the cutting edge 124 diametrically opposite the cutting edge in operative position to secure the scarfing blade against rotation. Thus, to bring a fresh cutting edge 124 into operative position, the bolts 125 are merely loosened or removed so that the retainer plate 123 can be disengaged from the adjacent cutting edge. The scarfing blade is then rotated to the desired position, and the retainer plate is tightened to affix the blade in this position.

The scarfing blade severs the raised bead from the advancing tube 11 in the form of a continuous ribbon of material 128. In order to collect the ribbon with a minimum of inconvenience, there is mounted on a pedestal 129 above the scarfing mechanism 55 a winding reel 130 suitably propelled by a drive unit 132 (FIG. 1). The ribbon 128 is directed upwardly as it is severed from the tube and over a guide roller 133 rotatably carried by a mounting bracket 134 affixed to the U-shaped carrier 64 for winding upon the reel 130. When the reel becomes filled the ribbon is severed and the accumulated material removed from the reel or the filled reel is replaced by an empty reel, and the severed end of the ribbon is attached to the reel to again begin accumulating thereon.

Briefly reviewing a preferred manner of operating the novel scarfing unit, with the piston rod 95 retracted to move the cutting assembly 100 to its raised, inoperative position, a selected scarfing blade 122 is adjusted to bring a desired cutting edge 124 into operative position. The travelling support block 105 is moved laterally by manipulating the hand wheel 113 to approximately align the cutting edge with the bead 15 on the tube 11 as it advances through the mill. The elevation of the guide rolls 32 and 33 may be adjusted as necessary by manipulating the adjusting wheel 54 to insure that the tube is properly seated within the curved peripheral surface 34 of the support roll 30. Anticipated vertical positioning for the cutting edge 124 may be approximated by suitably manipulating the hand wheel 75 to raise or lower the carrier 64 to a selected position. The cylinder may then be actuated to extend the piston rod 95 and lower the mounting block 62, thereby moving the cutting edge 124 of the scarfing blade into operating position. The blade is then precisely positioned vertically and laterally relative to the bead and tube seam by means of the adjusting wheels 75 and 113, and the ribbon 128 is entrained over the guide roller 132 and onto the winding reel 130.

When the cutting edge 124 currently in use becomes dulled or otherwise requires replacement, the cylinder is actuated to quickly raise the cutting assembly out of operative position and the support block 105 is moved laterally by means of the wheel 113 to bring the other of the blade holders 117 having a scarfing blade 122 with a fresh cutting surface 124 in operative position, into alignment with the seam of the tube. The cutting assembly is then lowered by actuating the cylinder 94, and the position of the scarfing blade 122 is adjusted as necessary by means of the wheels 75 and 113 to precisely locate the cutting edge 124. As will be readily apparent, the cutting edge may thus be replaced and precisely adjusted with very little interruption in production. Of course, if two of the scarfing units are located in tandem as illustrated in FIG. 1, replacement can be accomplished with no interruption in production.

It is to be understood that the form of the invention herewith shown and described is to be taken as an illustrative embodiment only of the same, and that various changes in the shape, size and arrangement of parts may be resorted to without departing from the spirit of the invention.

What is claimed is:

1. Apparatus for scarfing a longitudinally extending raised bead from the outer surface of an advancing elongated member comprising a base, rollers mounted upon said base for advancing said elongated member along a predetermined path, a mounting block, means for moving said mounting block toward and away from said elongated member, a traveling support block carried by said mounting block, means for moving said support block relative to said mounting block and transversely of said path, at least one scarfing blade carried by said support block, said scarfing blade having at least one cutting edge adapted to scarfingly engage said surface and sever said raised bead from said advancing member, a carrier member mounted for reciprocating movement toward and away from said advancing elongated member, linkage means connecting said mounting block to said carrier member, said linkage means selectively affixing said mounting block in a predetermined position relative to said carrier member for movement in unison with said carrier member and for reciprocating movement toward and away from said carrier member, a spaced pair of upstanding side plates supported upon said base, a vertically extending side rail affixed to each said side plate, said carrier member and said mounting block being slidingly mounted upon said rails for reciprocating movement therealong, and extendable jack means operable between said side plates and said carrier member for selectively positioning said carrier member along said side rails, said linking means comprising a boss extending from said mounting block, at least one link member pivotally connected to said boss, a transversely extending shaft rotatably mounted in said carrier member, an arm affixed to said shaft, means pivotally connecting said arm to said at least one link, a crank arm affixed to said shaft, and reciprocable drive means connected to said crank arm for selectively rotating said crank arm to thereby raise and lower said mounting block relative to said carrier member.

2. Apparatus for scarfing a longitudinally extending raised bead from the outer surface of an advancing elongated member comprising a base, rollers mounted upon said base for advancing said elongated member along a predetermined path, a mounting block, means for moving said mounting block toward and away from said elongated member, a travelling support block carried by said mounting block, means for moving said support block relative to said mounting block and tranversely of said path, at least one scarfing blade carried by said support block, said scarfing blade having at least one cutting edge adapted to scarfingly engage said surface and sever said raised bead from said advancing member, a bed plate affixed to said mounting block, a raised flange on said bed plate extending along said bed plate and transversely of said path, said support block including a mating recess receiving said raised flange for sliding transverse movement of said support block along said bed plate, a threaded opening extending through said bed plate, and a lead screw rotatably connected to said support block and threaded into said opening for selective advancement and retraction of said lead screw along said opening to thereby move said support block and said scarfing block thereon to selected lateral positions relative to said advancing elongated member, a wedge block affixed to said support block and having a face sloping downwardly and toward the advancing elongated member, a laterally spaced pair of blade holders extending along the sloping face, and a cover plate removably affixing said blade holders to said wedge block, a said scarfing blade being affixed to each of said blade holders.

3. Apparatus for scarfing a longitudinally extending raised bead from the outer surface of an advancing elongated member comprising a base, rollers mounted upon said base for advancing said elongated member along a predetermined path, a carrier member mounted for reciprocating movement toward and away from said advancing elongated member, a mounting block, pivotally interconnected elongated linkage means connecting said mounting block to said carrier member, said linkage means selectively affixing said mounting block in a predetermined position relative to said carrier member for movement in unison with said carrier member and for reciprocating movement toward and away from said carrier member, a traveling support block carried by said mounting block, means for moving said support block relative to said mounting block and transversely of said path, and at least one scarfing blade carried by said support block, said scarfing blade having at least one cutting edge adapted to scarfingly engage said surface and sever said raised bead from said advancing member, the rollers including a first said roller over which said elongated member passes and positioned beneath the point at which said cutting edge scarfingly engages said surface, an associated pair of cooperating second said rollers positioned to receive said elongated member therebetween following scarfing of said raised bead, and means for adjusting the elevation of said pair of second rollers relative to said first roller.

4. Apparatus for scarfing a longitudinally extending raised bead as claimed in claim 3, including a pair of said scarfing blades carried by said support block and laterally spaced from one another whereby upon said movement of said support block transversely of said path, each said scarfing blade may be selectively moved into operative position along said elongated member.

5. Apparatus for scarfing a longitudinally extending raised bead as claimed in claim 3, including a blade holder detachably affixed to said support block, said scarfing blade including a plurality of said cutting edges, and means mounting said scarfing blade on said blade holder for movement of any selected one of said cutting edges into position for scarfingly engaging said surface.

6. Apparatus for scarfing a longitudinally extending raised bead as claimed in claim 3, including a spaced pair of upstanding side plates supported upon said base, a vertically extending side rail affixed to each said side plate, said carrier member and said mounting block being slidingly mounted upon said rails for reciprocating movement therealong, and extendable jack means operable between said side plates and said carrier member for selectively positioning said carrier member along said side rails.

7. Apparatus for scarfing a longitudinally extending raised bead as claimed in claim 4, including a bed plate affixed to said mounting block, a raised flange on said bed plate extending along said bed plate and transversely of said path, said support block including a mating recess receiving said raised flange for sliding transverse movement of said support block along said bed plate, a threaded opening extending through said bed plate, and a lead screw rotatably connected to said support block and threaded into said opening for selective advancement and retraction of said lead screw along said opening to thereby move said support blade and said scarfing block thereon to selected lateral positions relative to said advancing elongated member.

8. Apparatus for scarfing a longitudinally extending raised bead as claimed in claim 1, including a bed plate affixed to said mounting block, a raised flange on said bed plate extending along said bed plate and transversely of said path, said support block including a mating recess receiving said raised flange for sliding transverse movement of said support block along said bed plate, a threaded opening extending through said bed plate, a lead screw rotatably connected to said support block and threaded into said opening for selective advancement and retraction of said lead screw along said opening to thereby move said support block and said at least one scarfing blade thereon to selected lateral positions relative to said advancing elongated member, a wedge block affixed to said support block and having a face sloping downwardly and toward the advancing elongated member, a laterally spaced pair of blade holders extending along the sloping face, and a cover plate removably affixing said blade holders to said wedge block, a said scarfing blade being affixed to each of said blade holders.

* * * * *